(12) United States Patent
Ryan

(10) Patent No.: US 10,368,680 B2
(45) Date of Patent: Aug. 6, 2019

(54) COOKWARE AND GEOMETRICALLY PATTERNED MAGNETIC STIRRER ASSEMBLY

(71) Applicant: Deborah Ryan, Phil Campbell, AL (US)

(72) Inventor: Deborah Ryan, Phil Campbell, AL (US)

(*) Notice: Subject to any disclaimer, the term of this patent is extended or adjusted under 35 U.S.C. 154(b) by 199 days.

(21) Appl. No.: 15/478,514

(22) Filed: Apr. 4, 2017

(65) Prior Publication Data

US 2018/0184837 A1 Jul. 5, 2018

Related U.S. Application Data

(60) Provisional application No. 62/441,260, filed on Dec. 31, 2016.

(51) Int. Cl.

| A47J 27/00 | (2006.01) |
| A47J 36/16 | (2006.01) |
| A47J 43/046 | (2006.01) |
| B01F 13/08 | (2006.01) |
| B01F 15/00 | (2006.01) |
| H05B 6/12 | (2006.01) |
| A47J 36/32 | (2006.01) |

(52) U.S. Cl.
CPC ........... *A47J 27/004* (2013.01); *A47J 36/165* (2013.01); *A47J 43/0465* (2013.01); *B01F 13/0818* (2013.01); *B01F 15/00389* (2013.01); *H05B 6/1209* (2013.01); *A47J 36/32* (2013.01)

(58) Field of Classification Search
CPC ............ B01F 15/00389; A47J 43/0465; H05B 6/1209
See application file for complete search history.

(56) References Cited

U.S. PATENT DOCUMENTS

| 5,834,739 | A | 11/1998 | Lockwood et al. | |
| 6,962,433 | B2* | 11/2005 | Nichols | B01F 13/0818 366/274 |
| 7,153,021 | B2 | 12/2006 | Goodwin et al. | |
| 7,312,425 | B2* | 12/2007 | DeCobert | A47J 27/004 219/432 |

(Continued)

*Primary Examiner* — Ibrahime A Abraham
*Assistant Examiner* — Ahmad Abdel-Rahman
(74) *Attorney, Agent, or Firm* — Vincent G. LoTempio; Kloss, Stenger & LoTempio; David T. Stephenson

(57) ABSTRACT

A cookware and geometrically patterned magnetic stirrer assembly provides cookware for heating and stirring food. A heating element heats a cooking surface on the cookware. At least one geometrically patterned electromagnetic coil is integrated into the cookware. The electromagnetic coil generates a magnetic field when an electrical current passes through. At least one magnetic stirrer operates on the cooking surface to stir the food in response to the magnetic field, in accordance to the path of geometric pattern. Controllably applying varying electrical currents through the electromagnetic coil moves the magnetic stirrer in the path of the geometric pattern at varying speeds and directions. The electromagnetic coil can be arranged in a snowflake pattern, a spider web pattern, or a helix. A controller regulates electrical current through the heating element and the electromagnetic coil to allow the heating and stirring functions to operate independently of each other.

20 Claims, 16 Drawing Sheets

(56) References Cited

U.S. PATENT DOCUMENTS

| | | | |
|---|---|---|---|
| 8,474,369 B2* | 7/2013 | Herbst | B01F 13/08 366/241 |
| 2011/0199852 A1* | 8/2011 | Martin | A47J 43/046 366/113 |
| 2011/0300270 A1* | 12/2011 | Koppens | A47J 27/004 426/115 |
| 2015/0314253 A1* | 11/2015 | Cysewski | B01F 13/0818 366/273 |
| 2018/0139979 A1* | 5/2018 | Glynn | A23F 5/26 |
| 2018/0236124 A1* | 8/2018 | Young | A61L 15/60 |

\* cited by examiner

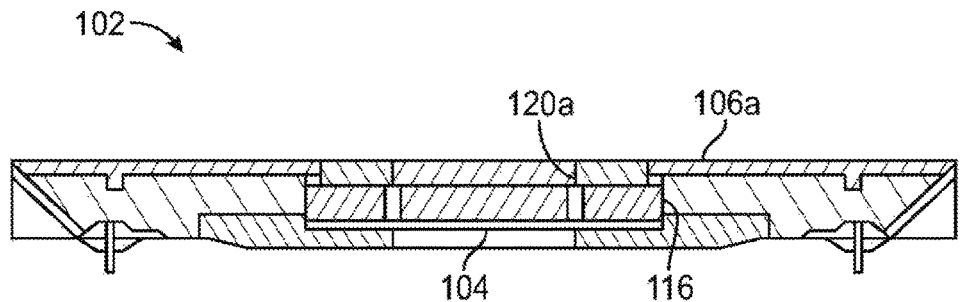
FIG. 8
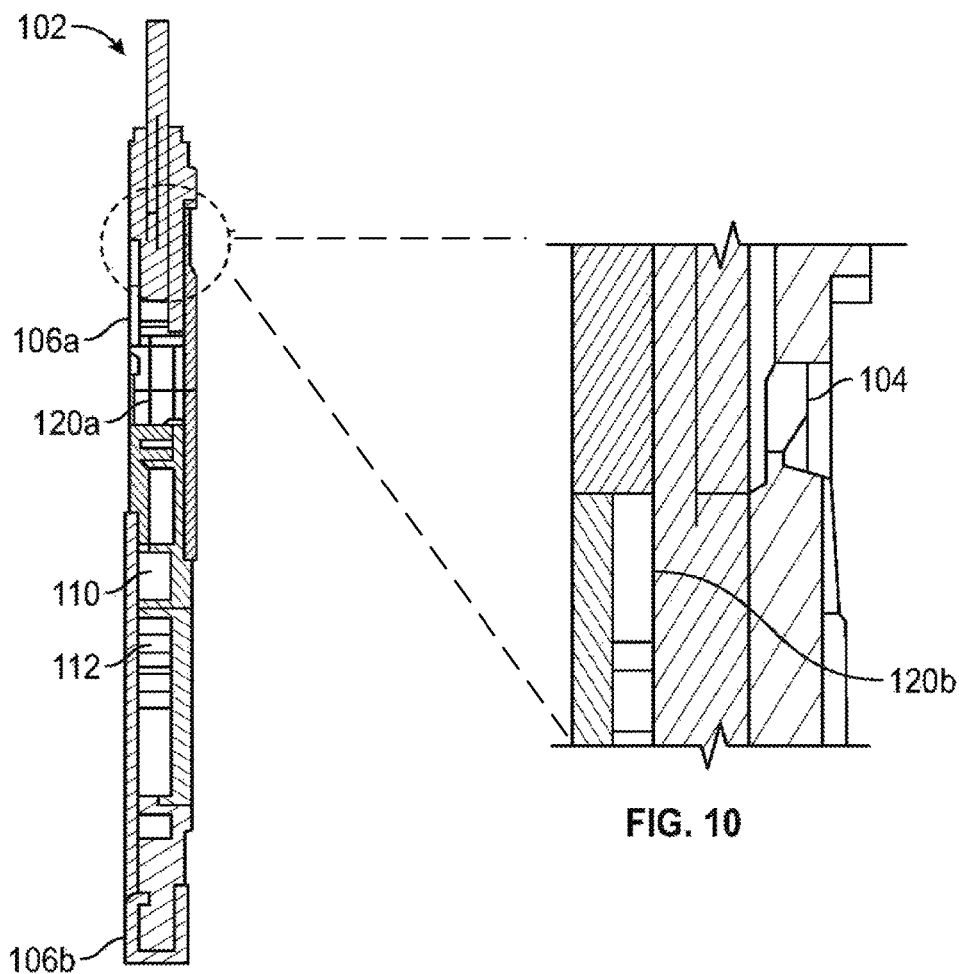
FIG. 9
FIG. 10

COOKWARE AND GEOMETRICALLY PATTERNED MAGNETIC STIRRER ASSEMBLY

CROSS REFERENCE OF RELATED APPLICATIONS

This application claims the benefits of U.S. provisional application No. 62/441,260, filed Dec. 31, 2016 and entitled ELECTRIC COOKER WITH ELECTROMAGNETIC STIRRER which provisional application is incorporated by reference herein in its entirety.

FIELD OF THE INVENTION

The present invention relates generally to a cookware and geometrically patterned magnetic stirrer assembly. More so, the present invention relates to a cookware and stirring assembly that integrates a heating element and a geometrically patterned electromagnetic coil into a cookware to heat food and control the stirring pattern of at least one magnetic stirrer; whereby varying electrical currents are applied to the geometrically patterned electromagnetic coil to produce at least one magnetic field through the cooking surface of the cookware, so as to induce the magnetic stirrer to move substantially along the geometric pattern of the electromagnetic coils in controllable forward and reverse stirring patterns, stirring speeds, and stirring directions; whereby a controller for the electrical current regulates temperature through the heating element and a timer for heating the food; whereby the electromagnetic coil and the heating element operate independently of each other, so that the heating and stirring functions are independent of each other; and whereby the assembly may be controlled remotely through Wi-Fi.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, cookware is a type of food preparation containers used in both home and commercial kitchen. The cookware can include eclectic cooking vessels, such as saucepans, skillets, slow cookers, and frying pans that are intended for use on a stove or range cooktop. Some cookware uses the principle of inductive heating to heat the food contained therein. Induction heating is a non-contact method of heating a conductive body by utilizing a strong magnetic field. It is often useful to stir the food, including sauces, gravies, and gels while they are being cooked in the cookware.

Generally, a slow cooker is a type of cooking device that is well known in the art. Slow cookers typically include removable ceramic (or stoneware) vessels to hold the food being cooked. The ceramic vessel is inserted into a heating liner which is placed within a metallic housing which follows the outer contours of the ceramic vessel so that when the heated liner is activated, the heat distributes over the surface of the ceramic. Slow cookers typically have a selector switch having a high (200° Fahrenheit), low (100° Fahrenheit) and off setting for varying heat settings.

It is known in the art that the heating units of slow cookers are typically simple devices and not magnetic. A slow cooker has an inner heat conductive, and usually metallic, liner which is used to evenly distribute heat over the ceramic vessel. The liner is usually heated by a thin heating element band which is wrapped around the exterior of the metallic basin. The heating element can be a simple heating band which is held on by a compression fit over the outside of the metallic basin. The liner typically has a ridge or similar structure that assists in securing the heating band around the liner.

Typically, slow cookers rely on a slow, low and even rate of cooking to function. Cooking time in slow cookers may be several hours. The low temperature of the cooking permits the user of the device to start cooking a meal in the morning and have it ready and properly cooked in time for dinner. Due to the slow cooking nature of the device, the contents of the ceramic need not be constantly monitored in order to prevent burning.

In addition, the relatively low power and even distribution of heat of the slow cooker prevents hot spots from forming in the ceramic, which could lead to thermal stresses and ultimately cracking of the ceramic. The ceramic that is used acts as an insulator which is beneficial for slow cooking and in even distribution of the heat. Slow cookers allow simmering type cooking over several hours.

Often, magnetic stirrers are used in chemistry and biology, where they can be used inside hermetically closed vessels without the need for complicated rotary seals. They are preferred over gear-driven motorized stirrers because they are quieter, more efficient, and have no moving external parts to break or wear out. Magnetic stir bars work well in glass vessels commonly used for chemical reactions as glass does not appreciably affect a magnetic field. The limited size of some stirring bars limits magnetic stirrers to non-viscous liquids.

Specialty high-effective stirring bars have been developed, ideal for viscous media, stirring over wide distances or for disadvantageous vessel bottoms and other stirring challenges. Because of its small size and Teflon coating, a stirring bar is easily cleaned and sterilized. Further, magnetic stirrers do not require lubricants which could contaminate food; and magnetic stirrers are known in the art to be operable in boiling liquids.

Other proposals have involved heating and stirring assemblies in cookware. The problem with these assemblies is that they do not automate the stirring process through use of electromagnetic coils. Also, the stirrer is not adaptable to follow various patterns, speeds, and directions, so as to optimize stirring. Also, the stirring and heating functions are not separate. Even though the above cited cookware meets some of the needs of the market, a cookware and geometrically patterned magnetic stirrer assembly that provides cookware for heating and stirring food and at least one geometrically patterned electromagnetic coil that is integrated into the cookware; whereby the electromagnetic coil generates a magnetic field when an electrical current passes through; and whereby at least one magnetic stirrer operates on the cooking surface to stir the food in response to the magnetic field, in accordance to the path of geometric pattern is still desired.

SUMMARY

Illustrative embodiments of the disclosure are generally directed to a cookware and geometrically patterned magnetic stirrer assembly. The cookware and geometrically patterned magnetic stirrer assembly provides a cookware for heating and stirring food. A heating element works to heat a cooking surface on the cookware to heat food. At least one geometrically patterned electromagnetic coil is integrated into the cookware. The electromagnetic coil generates at least one magnetic field when an electrical current passes through. At least one magnetic stirrer is operable on the cooking surface of the cookware to stir the food and contents therein in response to the magnetic field, and in accordance with the path of the geometric pattern.

The unique geometric pattern of the magnetic coil is efficacious for controlling the stirring pattern of a magnetic stirrer along the general path of the geometric pattern formed by the electromagnetic coils. This is achieved by controllably applying varying electrical currents through the electromagnetic coil. The electrical currents produces at least one magnetic field, i.e., magnetic flux, that moves the magnetic stirrer in a stirring pattern that substantially follows the path of the geometric pattern of the electromagnetic coil. Thus, as the electrical current passes through the magnetic coil, at least one magnetic field is activated to act on the magnetic stirrer in one or more dimensions, and generally along the path of the geometric pattern.

In one embodiment, the electromagnetic coil is integrated between a cooking surface and an outer surface in the cookware. An electrical power source, such as A/C current, is connected to the electromagnetic coil. The electromagnetic coils are arranged in at least one geometric pattern, such as a snowflake pattern, a spider web pattern, a coil, a spiral, a helix, and any general irregular pattern. The electrical current is controllably applied to the electromagnetic coil to generate an external magnetic field having a magnitude and direction that penetrate the cooking surface of the cookware. A controller is used to vary the electrical current. So that the at least one magnetic field can be manipulated based on the varying direction and intensity of electrical current applied to the electromagnetic coil from the electrical power source.

The at least one magnetic field controls the stirring articulation of the magnetic stirrer along the geometrically patterned electromagnetic coils. In this manner, the magnetic stirrer is adaptable to follow various patterns, speeds, and directions, so as to optimize stirring. The movement of the magnetic stirrer may include a forward and reverse stirring pattern, a stirring speed, a stirring direction, a temperature, and a timer. The controller regulates electrical current through the magnetic stirrer and the heating element of the cookware. This allows heating and stirring functions to operate independently of each other, whereby stirring on the cooking surface of the cookware can occur without heating the cookware. Additionally, the assembly may be controlled remotely through Wi-Fi, radio frequency, and the like.

In one aspect, a cookware and geometrically patterned magnetic stirrer assembly, comprises:
a cookware comprising a cooking surface, an outer surface, and a heating element operable to generate heat for the cooking surface;
at least one magnetic stirrer operational on the cooking surface;
an electromagnetic coil integrated between the cooking surface and the outer surface, the electromagnetic coil arranged in at least one geometric pattern;
an electrical power source operatively connected to the at least one electromagnetic coil, the electrical power source operable to transmit an electrical current through the electromagnetic coil,
whereby the electromagnetic coil produces at least one magnetic field through the cooking surface,
whereby the at least one magnetic stirrer is responsive to the at least one magnetic field,
whereby the at least one magnetic stirrer moves generally in correlation with the at least one geometric pattern in response to the at least one magnetic field; and
a controller operatively connected to the electrical power source, the controller operable to vary the electrical current, whereby the speed and direction of the at least one magnetic stirrer varies in accordance with the varying electrical current,
whereby the heat generated by the heating element varies in accordance with the varying electrical current,
whereby the speed and direction of the at least one magnetic stirrer, and the heat generated by the heating element are independently regulated by the controller.

In another aspect, the cookware includes at least one of the following: a skillet, a slow cooker, a frying pan, a pressure cooker, and a Dutch oven.

In another aspect, the cookware comprises a handle.

In another aspect, wherein the cookware comprises a Wi-Fi transmitter.

In another aspect, the Wi-Fi transmitter is disposed in the handle of the cookware.

In another aspect, the cookware comprises a temperature inductive probe.

In another aspect, the Wi-Fi transmitter and the heating element are electrically connected to the temperature inductive probe.

In another aspect, the controller comprises a digital display and light emitting diodes.

In another aspect, electrical power source is an alternating current.

In another aspect, the at least one geometric pattern includes at least one of the following: a snowflake pattern, a spider web pattern, a coil, a spiral, a helix, and a general irregular pattern In another aspect, the heating element is operable to convert the electrical current into heat through the processes of induction heating, or resistive heating, or both.

In another aspect, the at least one magnetic stirrer comprises a stirring bar, or a blade-like stirrer, or both.

In another aspect, the heating element is operatively connected to a timer.

One objective of the present invention is to provide a magnetic stirrer that is operable in a cookware to move in a geometric pattern that enhance the stirring and mixing of the contents of the cookware.

Another objective is to provide configure the geometric pattern so that a desired stirring effect is achieved.

Another objective is to vary the speed and direction of the magnetic stirrer, based on the viscosity and type of food being stirred in the cookware.

Another objective is to provide a controller that regulates the speed and direction of the at least one magnetic stirrer, and the heat generated by the heating element independently of each other, whereby the stirrer can be operational while no heating is taking place, and vice versa.

Another objective is to remotely operate the assembly with a Wi-Fi.

Another objective is to regulate electrical current through the electromagnetic coil in different directions and intensities.

Another objective is to provide different types and shapes of magnetic stirrers for different types of foods.

Another objective is to provide an inexpensive to manufacture

Another objective is to provide cookware and geometrically patterned magnetic stirrer assembly.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 8 illustrates a sectioned view of an electromagnetic coil, in accordance with an embodiment of the present invention;

FIG. 9 illustrates a sectioned view of a cookware, showing a heating element, a controller, and a timer in accordance with an embodiment of the present invention;

FIG. 10 illustrates a sectioned view of the circled section of the cookware taken from FIG. 9, in accordance with an embodiment of the present invention;

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A cookware and geometrically patterned magnetic stirrer assembly 100 is referenced in FIGS. 1-22. Cookware and geometrically patterned magnetic stirrer assembly 100, hereafter "assembly 100", provides a cookware 102 for heating food in normal cooking processes, and also for automatically stirring the food in a predetermined stirring pattern through use of at least one magnetic stirrer 122. Further, the food in cookware 102 may be heated or stirred as independent functions, so that stirring may occur without requiring simultaneous heating, and vice versa.

Figure 1:
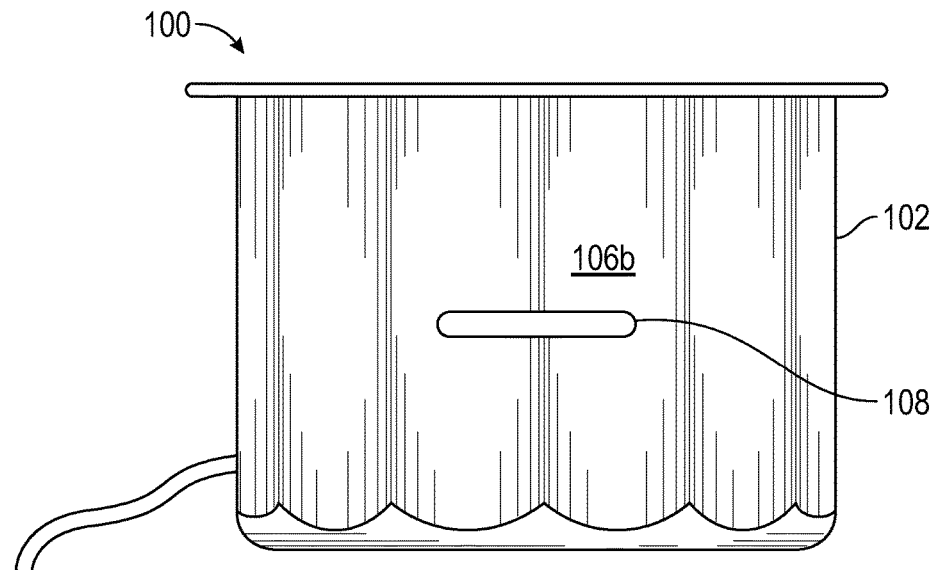
FIG. 1 illustrates a perspective view of an exemplary cookware and geometrically patterned magnetic stirrer assembly, in accordance with an embodiment of the present invention.

In one possible embodiment of assembly 100 shown in FIG. 1, the cookware 102 is a food container known in the art. A heating element 104 works to heat a cooking surface 106a on the cookware 102, so as to controllably heat the food to a desired temperature. Integrated into the cookware 102 is at least one geometrically patterned electromagnetic coil 116. Electromagnetic coil 116 functions to generate at least one magnetic field 118 when an electrical current passes through. This magnetic field 118 may be in the form of magnetic flux that passes through the cooking surface 106a at a perpendicular direction. Magnetic field 118 directly controls stirring pattern of at least one magnetic stirrer 122, discussed below.

Magnetic stirrer 122 is operable on the cooking surface 106a of cookware 102 to stir the food and contents therein in response to the magnetic field 118, and in accordance with the path of the at least one geometric pattern 120a-i. The direction, speed, and duration of spinning pattern followed by magnetic stirrer 122 is adjustable based on the intensity of electrical current passing through the electromagnetic coil 116. In this manner, magnetic stirrer 122 is adaptable to follow various patterns, speeds, and directions, so as to optimize stirring functions in cookware 102.

In essence, the unique geometric pattern 120a-i of the magnetic coil 116 is determinative in controlling the stirring pattern of a magnetic stirrer 122 along the general path of the geometric pattern 120a, 120b, 120c formed by the electromagnetic coil 116. This is achieved by controllably applying varying electrical currents through electromagnetic coil 116.

The electrical currents produces at least one magnetic field 118, i.e., magnetic flux, that moves magnetic stirrer 122 in a stirring pattern that substantially follows the path of the geometric pattern 120a-i of the electromagnetic coil 116. Thus, as the electrical current passes through magnetic coil 116, at least one magnetic field 118 is activated to act on magnetic stirrer 122 in one or more dimensions, and generally along the path of geometric pattern 120a, 120b, 120c.

Figure 2:
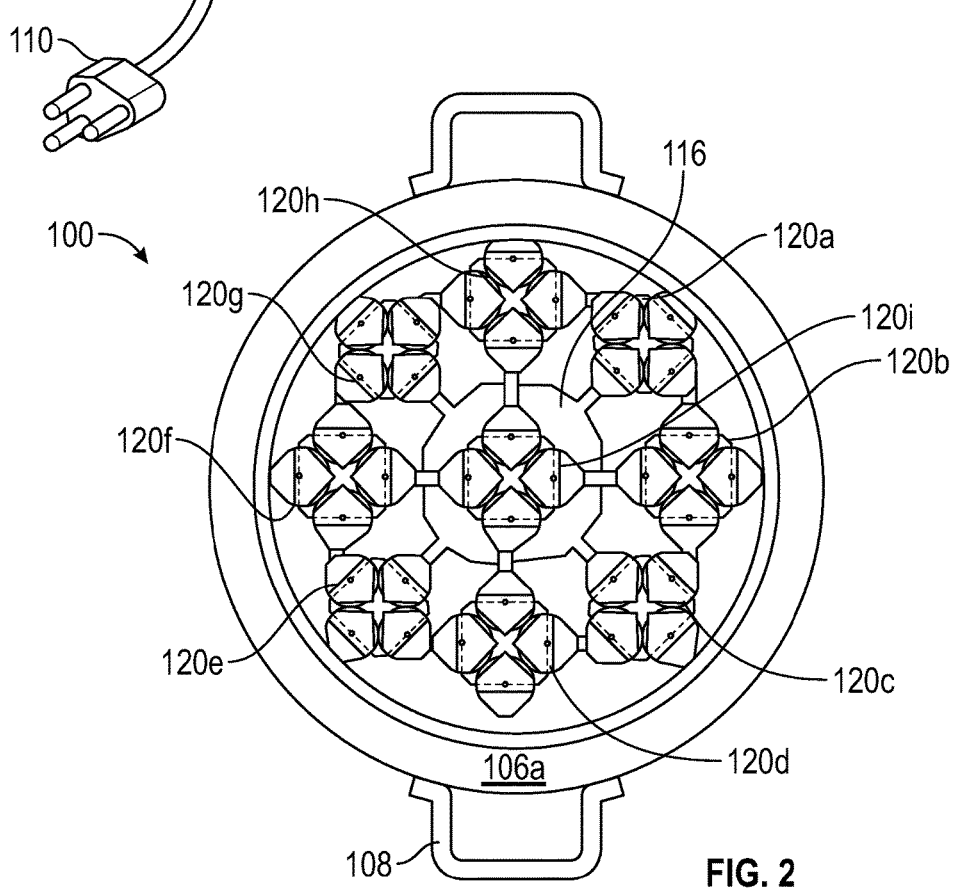
FIG. 2 illustrates a top view of the cookware and geometrically patterned magnetic stirrer assembly shown in FIG. 1, in accordance with an embodiment of the present invention.

As referenced in FIG. 2, assembly 100 comprises a cookware 102 that is defined by a cooking surface 106a, an outer surface 106b, and a heating element 104. The heating element 104 is operable to generate heat for cooking surface 106a. In one embodiment, heating element 104 is operable to convert the electrical current into heat through the processes of induction heating, or resistive heating, or both. In another embodiment, the heating element 104 is operatively connected to a timer 114, so that the duration of heating may be monitored and controlled. In another embodiment, cookware 102 comprises a handle 108 for manipulation thereof.

Figure 3:
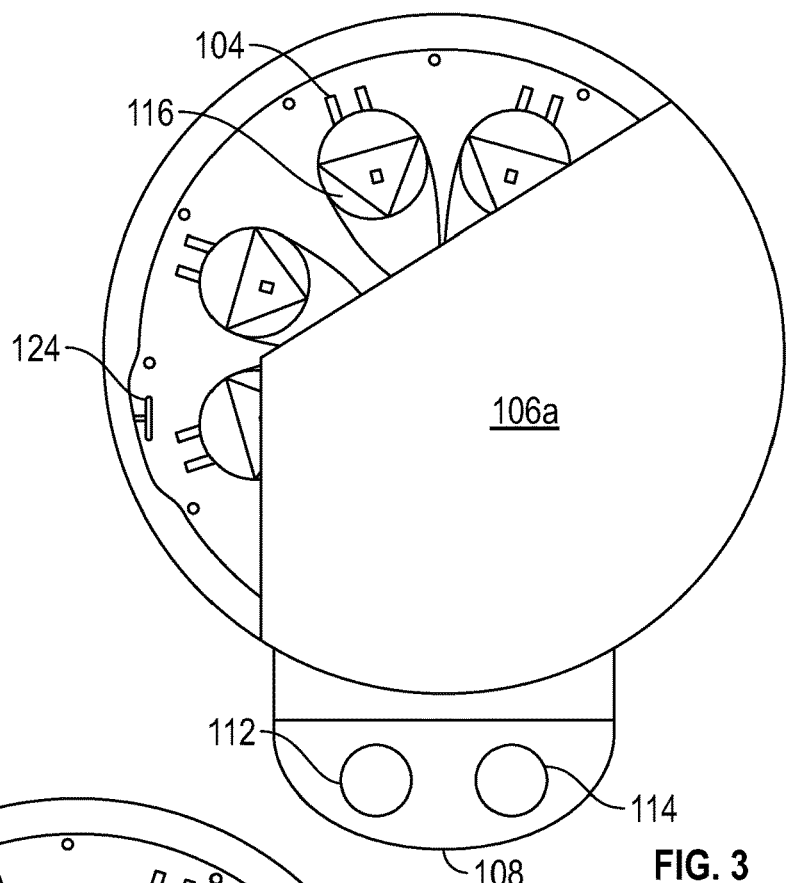
FIG. 3 illustrates a top view of an exemplary cookware, showing the geometric pattern of electromagnetic coils partially covered by a cooking surface, in accordance with an embodiment of the present invention.

In yet another embodiment shown in FIG. 3, cookware 102 may include a housing having an interior which contains an electric wrap-around heating element 104 for heating the side walls of a lidded round shaped cooking vessel. The wattage is sufficient to bring water to low boil or higher. Other features that cookware 102 may have include a heatproof glass cooking liner, e.g. Pyrex; soda-lime glass or borosilicate, which is removable and acts as a heat insulator. In some embodiments, cookware 102 may include, without limitation, a skillet, a slow cooker, a frying pan, a pressure cooker, and a Dutch oven.

In some embodiments, magnetic stirrer 122 is operational on the cooking surface 106a to stir the food. Magnetic stirrer 122 may include a stirring bar, or a blade-like stirrer, or both. In other embodiments, magnetic stirrer 122 may include a specialty shaped stir bars, such as a whisk like, blade like, heavy duty magnetic stirrer to whip food, stir viscous, thick, and thin contents. Further, single or multiple magnetic stirrers can be used at once, changed, or completely removed from cookware 102 at any time during the stirring and cooking process.

In one exemplary use of magnetic stirrer 122, no heat is applied to the cooking surface 106a, yet magnetic stirrer 122 operates like a whisk and follows a geometric pattern 120a, 120b, 120c designed for whipping. This can be useful for whipping cream, eggs, or white meringue. Using a blade like stir bar and appropriate electromagnet pattern you can stir thick sauces or roux etc.

Another example includes magnetic stirrer 122 stirring non-viscous or thin liquids, stir eggs in liquid, stir bags/cheese cloth, stir herbs in liquid, etc. Thus, by using the appropriately shaped magnetic stirrer that follows an appropriate electromagnetic pattern, a variety of foods can be stirred effectively.

In some embodiments, magnetic stirrer 122 comprises a housing. An electric shaker drive may also be integrated into the magnetic stirrer 122 in the form of alternately energizable magnet coil 116 or electromagnets. Further, a control circuit having a circuit board with attached drive chips can be arranged for the stirrer drive. In yet other embodiments, magnetic stirrer 122 can have an upper horizontal casing which is approximately flush with the axial extent of the electromagnetic, discussed below coil 116. In another embodiment, magnetic stirrer 122 is coated in Polytetrafluoroethylene (PTFE) or Teflon to make magnetic stirrer 122 heat resistant and a non-contaminate.

Figure 4:
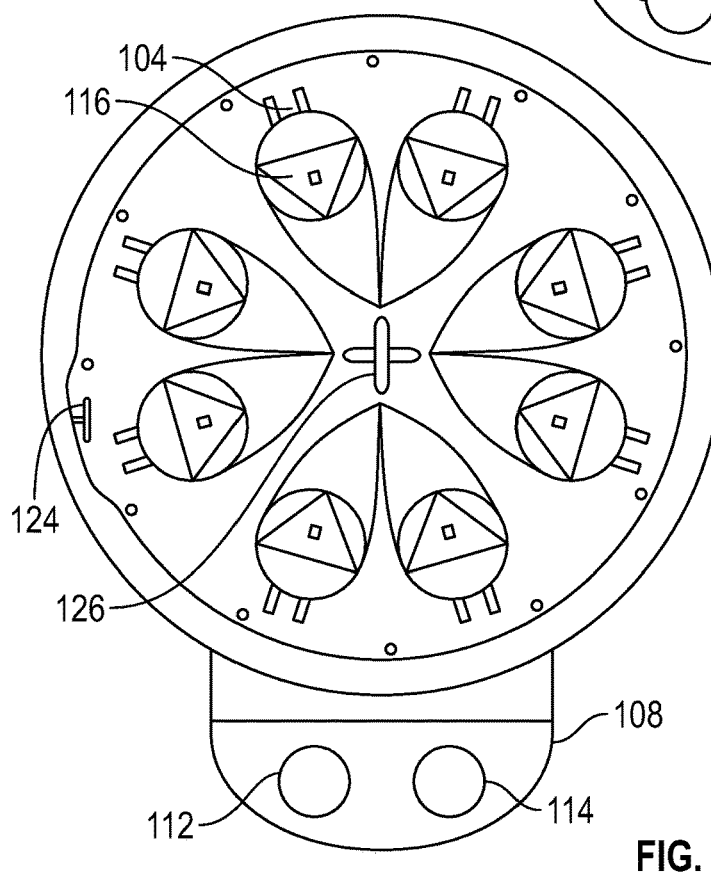
FIG. 4 illustrates a top view of a cookware, showing the geometric pattern of electromagnetic coils, in accordance with an embodiment of the present invention.

Turning now to FIG. 4, assembly 100 further provides an electromagnetic coil 116 that is integrated between the cooking surface 106a and the outer surface 106b of cookware 102. In some embodiments, electromagnetic coil 116 may be sandwiched between the walls and base of the skillet. Though any integration that allows magnetic fields 118 generated by electromagnetic coil 116 to penetrate the cooking surface 106a may be used. This is feasible because the magnetic force produced by electromagnetic coil 116 is sufficient to penetrate cooking surface 106a, and materials often used to construct cooking surface 106a, i.e., aluminum, steel, iron, metal alloys.

Figure 5:
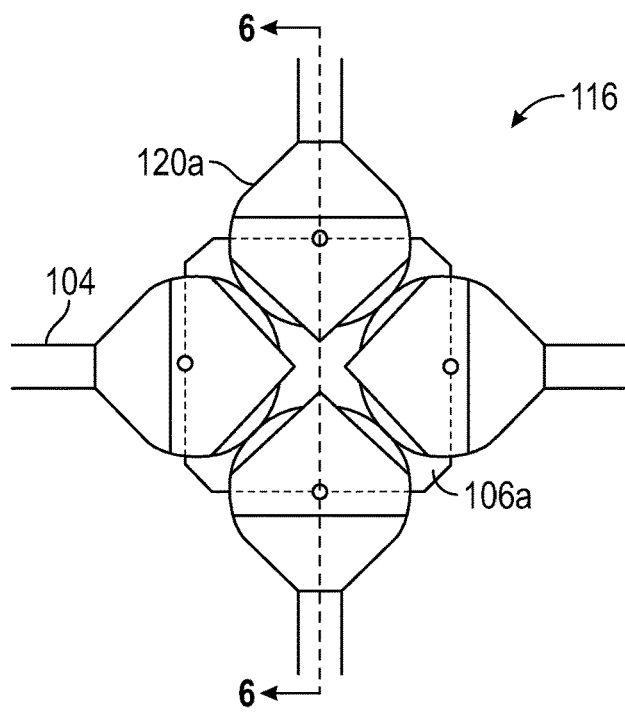
FIG. 5 illustrates a close up view of an exemplary geometric pattern of electromagnetic coils, in accordance with an embodiment of the present invention.
Figure 6:
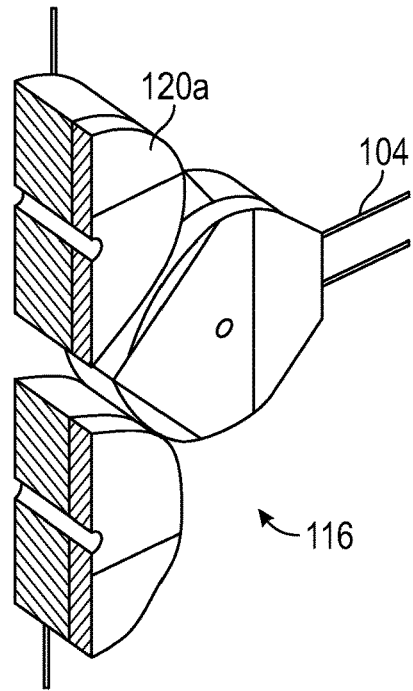
FIG. 6 illustrates a left side sectioned view of the geometric pattern of electromagnetic coils, the section taken along section 6-6 of FIG. 5, detailing a heating element and an electromagnetic coil, in accordance with an embodiment of the present invention.
Figure 7:
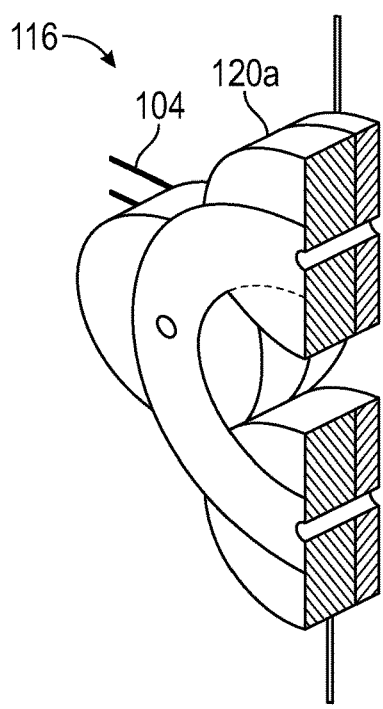
FIG. 7 illustrates a right side sectioned view of the geometric pattern of electromagnetic coils, in accordance with an embodiment of the present invention.

FIG. 5 illustrates an exemplary electromagnetic coil 116 with a symmetrical, diamond shape and having a heating element 104 and electrical wiring passing through. As the sectioned views of FIGS. 6 and 7 illustrate, electromagnetic coil 116 is unique in that it is arranged in at least one geometric pattern 120a, 120b, 120c. The geometric pattern 120a, 120b, 120c is arranged to optimize the stirring effect of magnetic stirrer 122. At least one geometric pattern 120a, 120b, 120c, 120d, 120e, 120f, 120g, 120h, 120i may include, without limitation, a snowflake pattern, a spider web pattern, a coil, a spiral, a helix, and a general irregular pattern.

Looking now at FIG. 8, an electrical power source 110 operatively connects to electromagnetic coil 116. Electrical power source 110 is operable to transmit an electrical current through the electromagnetic coil 116. In one possible embodiment, electrical power source 110 is an A/C current. Those skilled in the art will recognize that any conductor, including electromagnetic coil 116, creates a circular magnetic field 118 around the conductor when electricity is applied, due to Ampere's law.

As a result of electrical power source 110, the electromagnetic coil 116 controllably receives an electrical current, and thereby creates at least one external magnetic field 118 that corresponds to the geometric shape of the coils 116. Electromagnetic field 118 penetrates the cooking surface of the cookware 102 to induce magnetic stirrer 122 to move in conjunction with both the geometric pattern 120a, 120b, 120c, and the amount of electricity generated.

Figure 11:
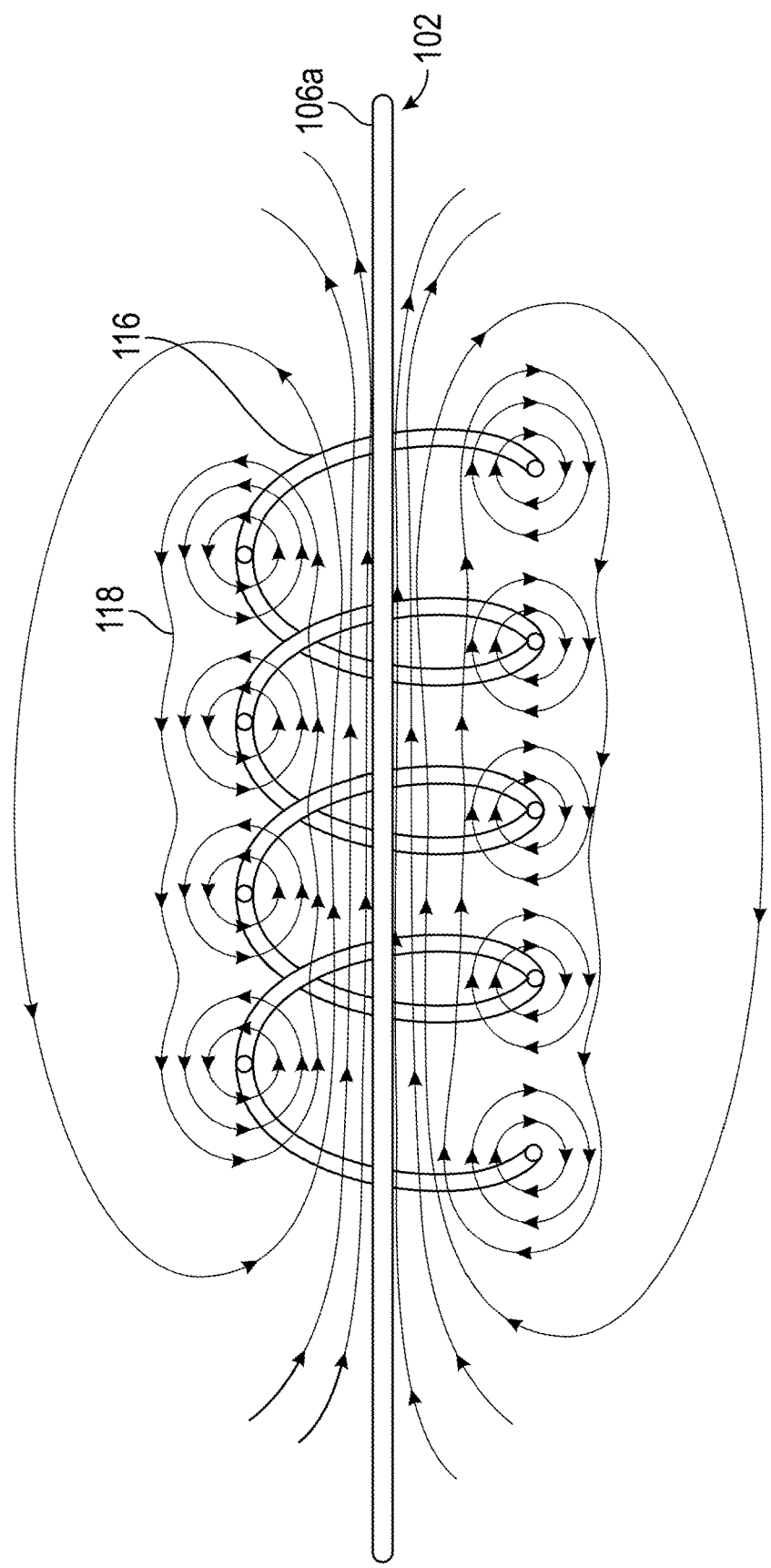
FIG. 11 illustrates a diagram of an exemplary external magnetic field generated along a magnetic coil when an electric current is applied, in accordance with an embodiment of the present invention.

This generation of magnetic field 118 is illustrated in the diagram of FIG. 11, which references an exemplary external magnetic field 118 that is generated along a magnetic coil 116 as an electric current is applied to magnetic coil 116. In this illustration, a magnetic flux forms across portions of magnetized electromagnetic coils 128a-1.

Thus, it is the generated electromagnetic field 118 that creates the desired stirring effect. Magnetic field 118 controls the stirring articulation of magnetic stirrer 122 along the geometrically patterned electromagnetic coil 116. The movement of the magnetic stirrer 122 may include a forward, reverse, lateral, and rotating stirring pattern, a stirring speed, a stirring direction, a temperature, and a duration for stirring.

Magnetic stirrer 122 is responsive to the at least one magnetic field 118.

Consequently, magnetic stirrer 122 moves generally in correlation with the at least one geometric pattern 120a, 120b, 120c in response to the at least one magnetic field 118. Thus, assembly 100 uses a rotating magnetic field 118 to cause magnetic stirrer 122 to stir on the cooking surface 106a of cookware 102. In this manner, magnetic stirrer 122 may be induced to move in a clockwise, counterclockwise, or other programmable direction.

FIGS. 12-22 illustrate a series of stirring patterns, i.e., axial motion, rotation, lateral motion, exhibited by the magnetic stirrer 122 along the cooking surface of cookware, in conjunction with a portion of electromagnetic coil 128a-1 that becomes magnetized as electrical current is controllably applied thereto. As the illustrations show, the magnetic stirrer 122 moves away from the non-magnetized portion of the electromagnetic coil 126 and follows the stronger magnetized portion of electromagnetic coil. Consequently, magnetic stirrer 122 follows geometric pattern 120a of the electromagnetic coils 116.

Figure 12:
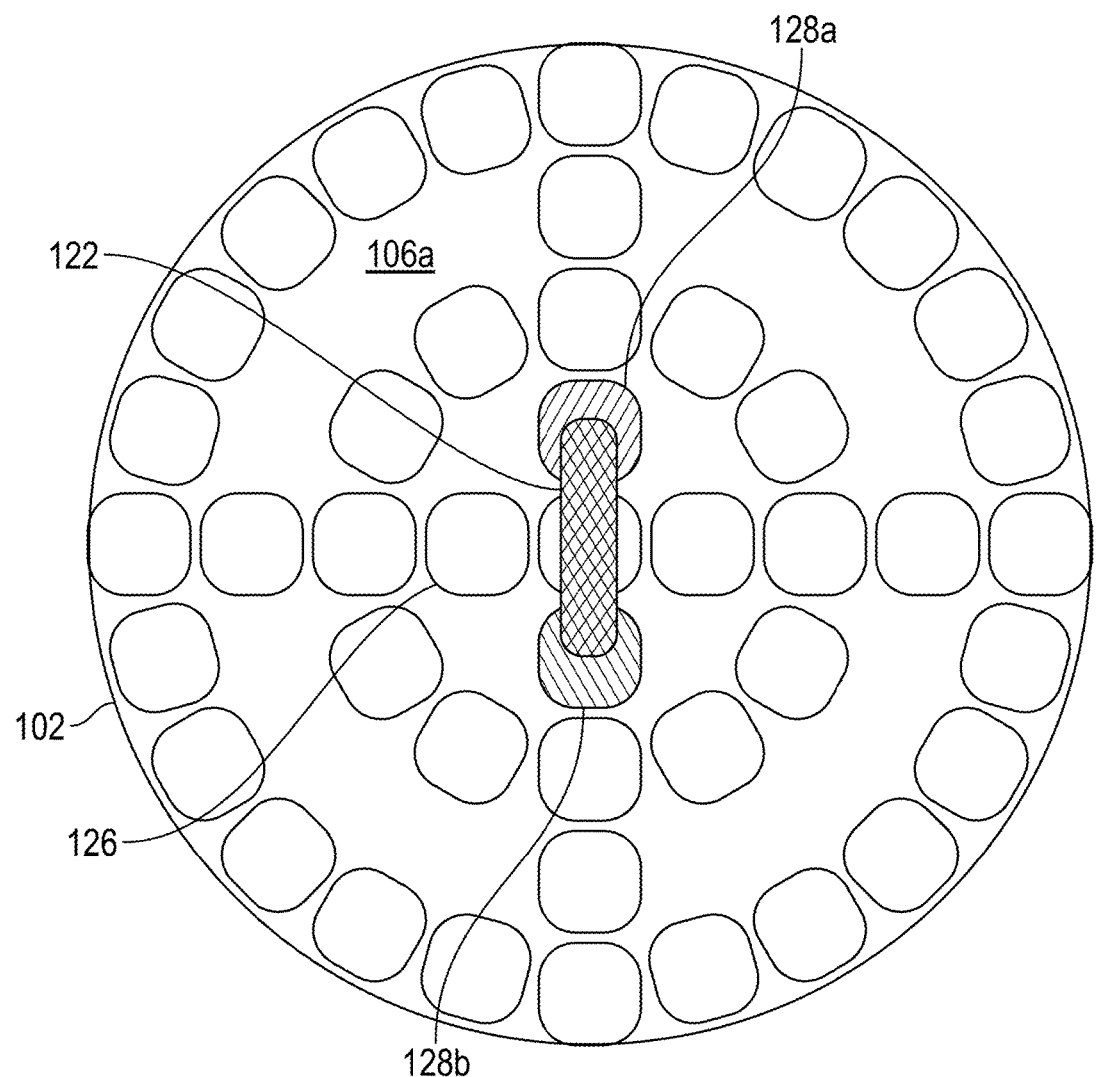
FIG. 12 illustrates a top view of an exemplary magnetic stirrer positioned centrally on a cooking surface while two central electromagnetic coils become magnetized as electrical current is applied, and a larger portion of non-magnetized electromagnetic coils do not receive electrical current, in accordance with an embodiment of the present invention.
Figure 13:
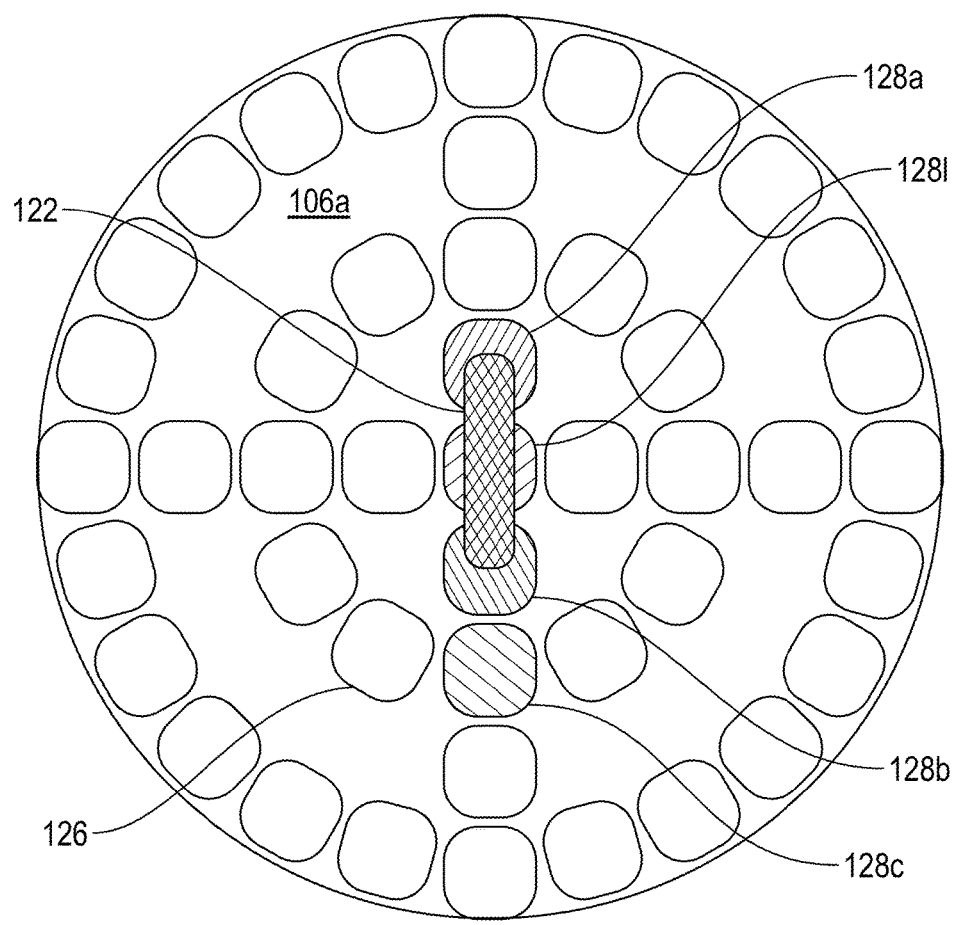
FIG. 13 illustrates a top view of the magnetic stirrer shown in FIG. 12 positioned centrally on a cooking surface while four central electromagnetic coils become magnetized as electrical current is applied, and a larger portion of non-magnetized electromagnetic coils do not receive electrical current, in accordance with an embodiment of the present invention.

For example, FIG. 12 illustrates a top view of magnetic stirrer 122 positioned centrally on cooking surface while two centrally disposed portions of electromagnetic coils 128a, 128b become magnetized as electrical current is applied. However it is significant to note that a larger portion of electromagnetic coils 126 do not receive electrical current, and thus are not magnetized. Magnetic stirrer 122 generally does not follow the path of non-magnetized coils 126. As FIG. 13 illustrates, magnetic stirrer 122 from FIG. 12 remains stationary and positioned centrally on cooking surface as two additional portions of electromagnetic coils 128c, 128l become magnetized where electrical current is applied.

Figure 14:
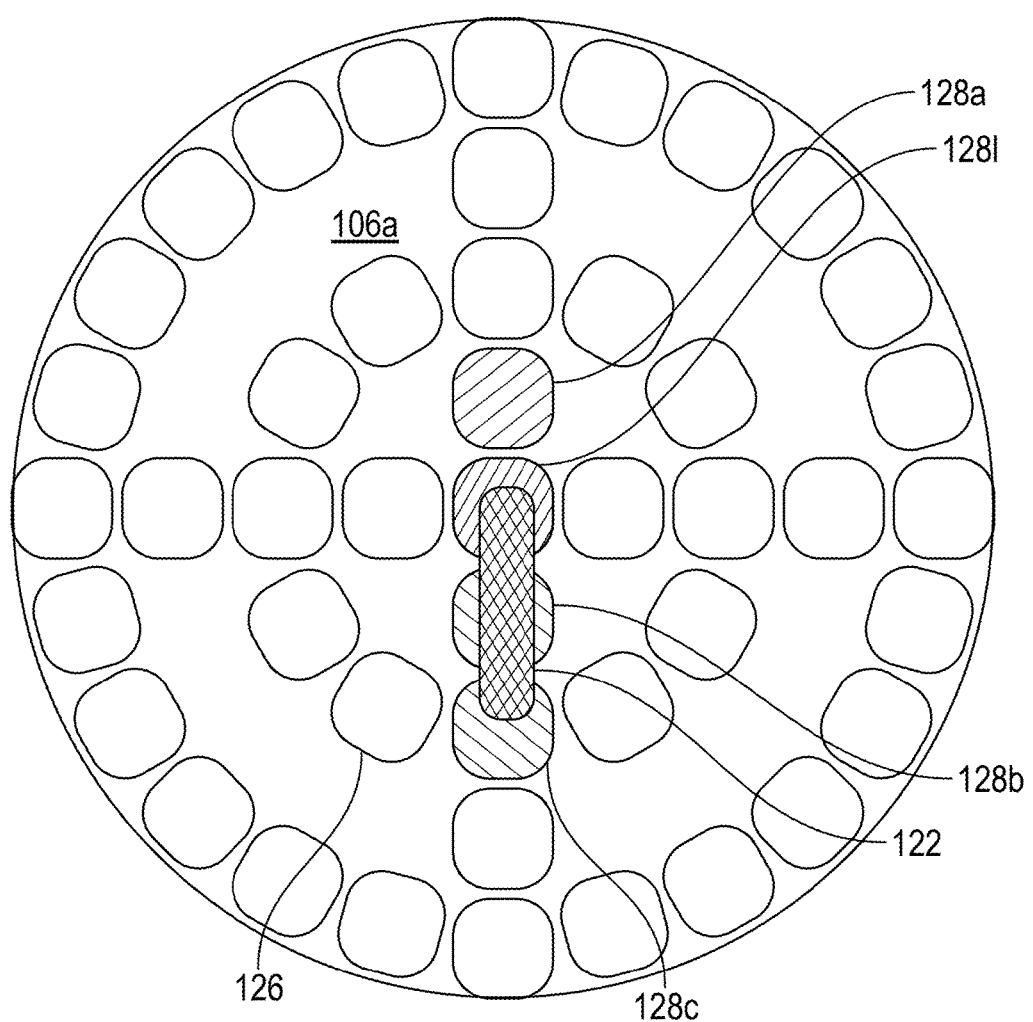
FIG. 14 illustrates a top view of the magnetic stirrer shown in FIG. 12 moving in a straight path in conjunction with an additional electromagnetic coil becomes magnetized as electrical current is applied, in accordance with an embodiment of the present invention.
Figure 15:
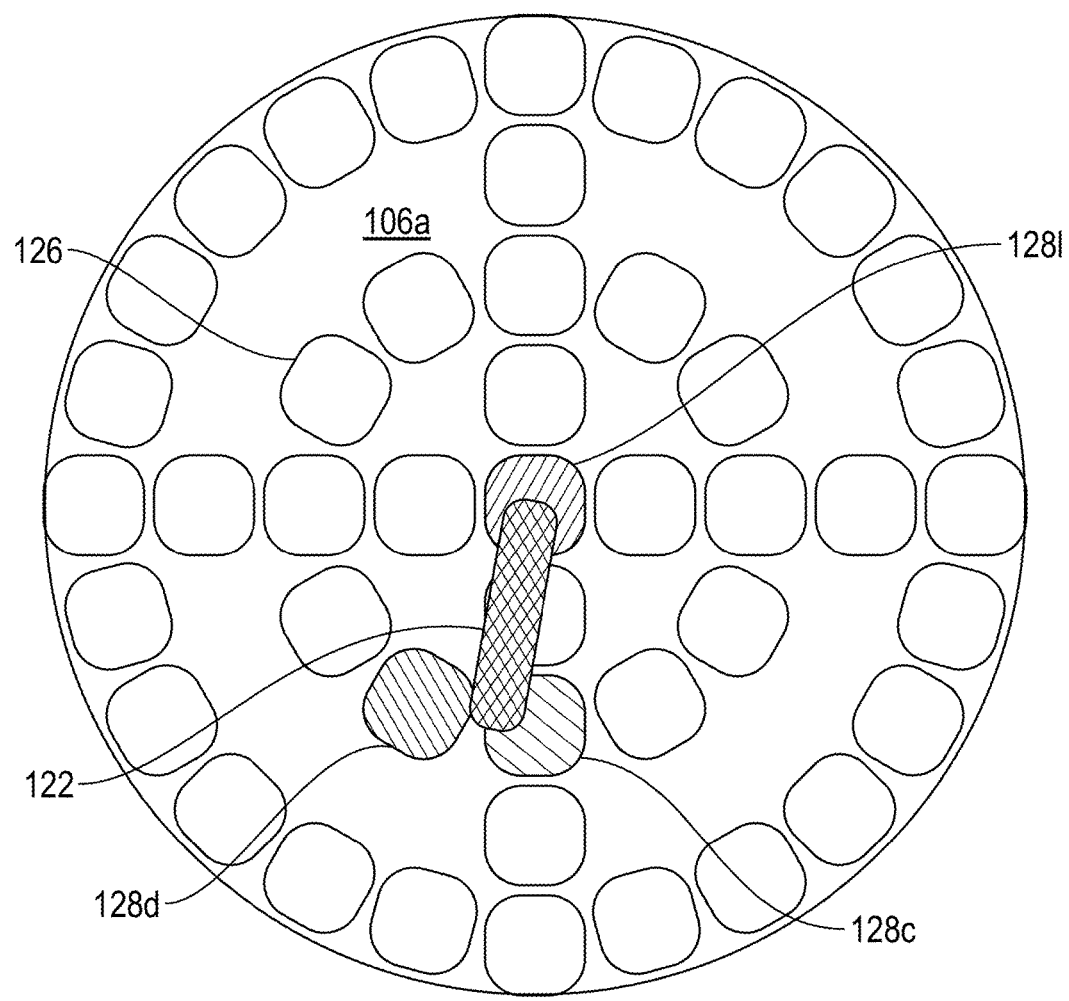
FIG. 15 illustrates a top view of the magnetic stirrer shown in FIG. 12 starting to rotate in conjunction with an additional electromagnetic coil becomes magnetized as electrical current is applied, in accordance with an embodiment of the present invention.
Figure 16:
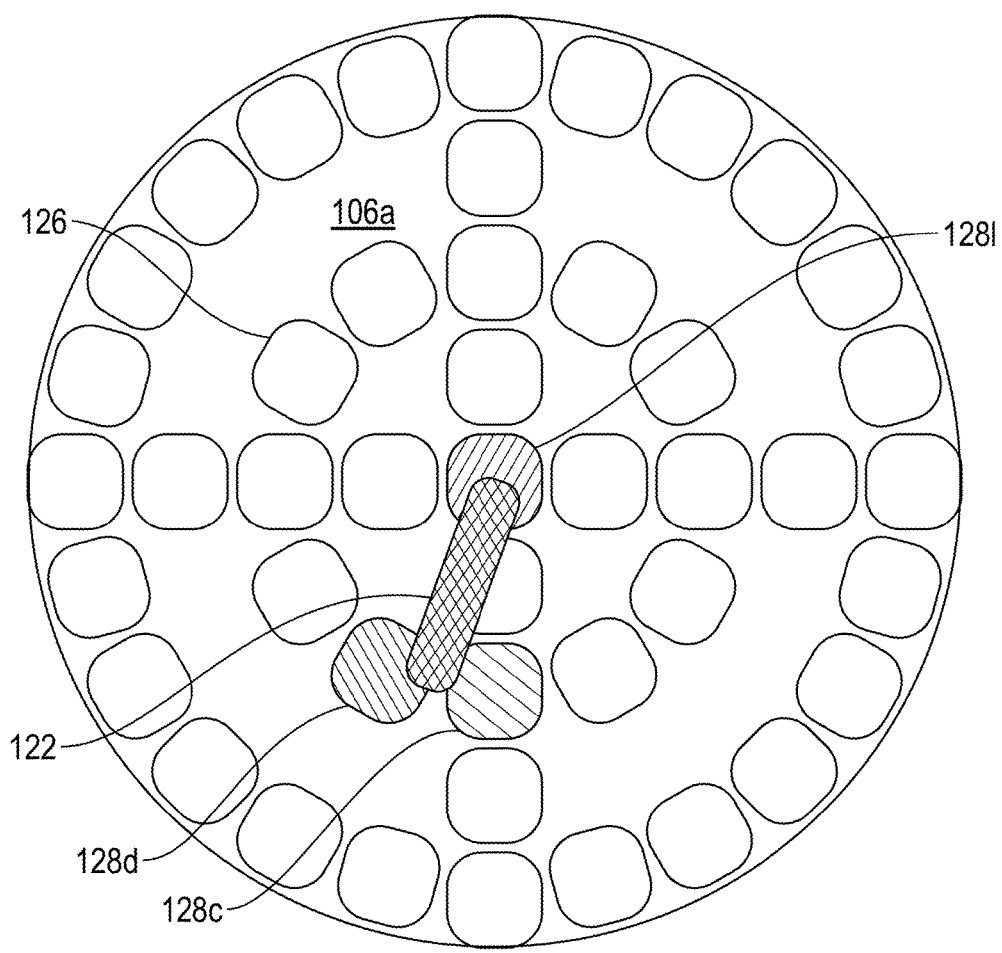
FIG. 16 illustrates a top view of the magnetic stirrer shown in FIG. 12 continuing to rotate in conjunction with the magnetized electromagnetic coils, in accordance with an embodiment of the present invention.

As magnetic stirrer 122 begins stirring pattern, FIG. 14 shows magnetic stirrer 122 moving in a straight path in conjunction with portion of magnetized electromagnetic coils 128a, 128b, 128c, 128l. Continuing the stirring path, FIG. 15 illustrates magnetic stirrer 122 starting to rotate in conjunction with an additional portion electromagnetic coil 128d becoming magnetized as electrical current is applied thereto. FIG. 16 illustrates magnetic stirrer 122 continuing to rotate in conjunction with magnetized electromagnetic coils 128l, 128c, 128d.

Figure 17:
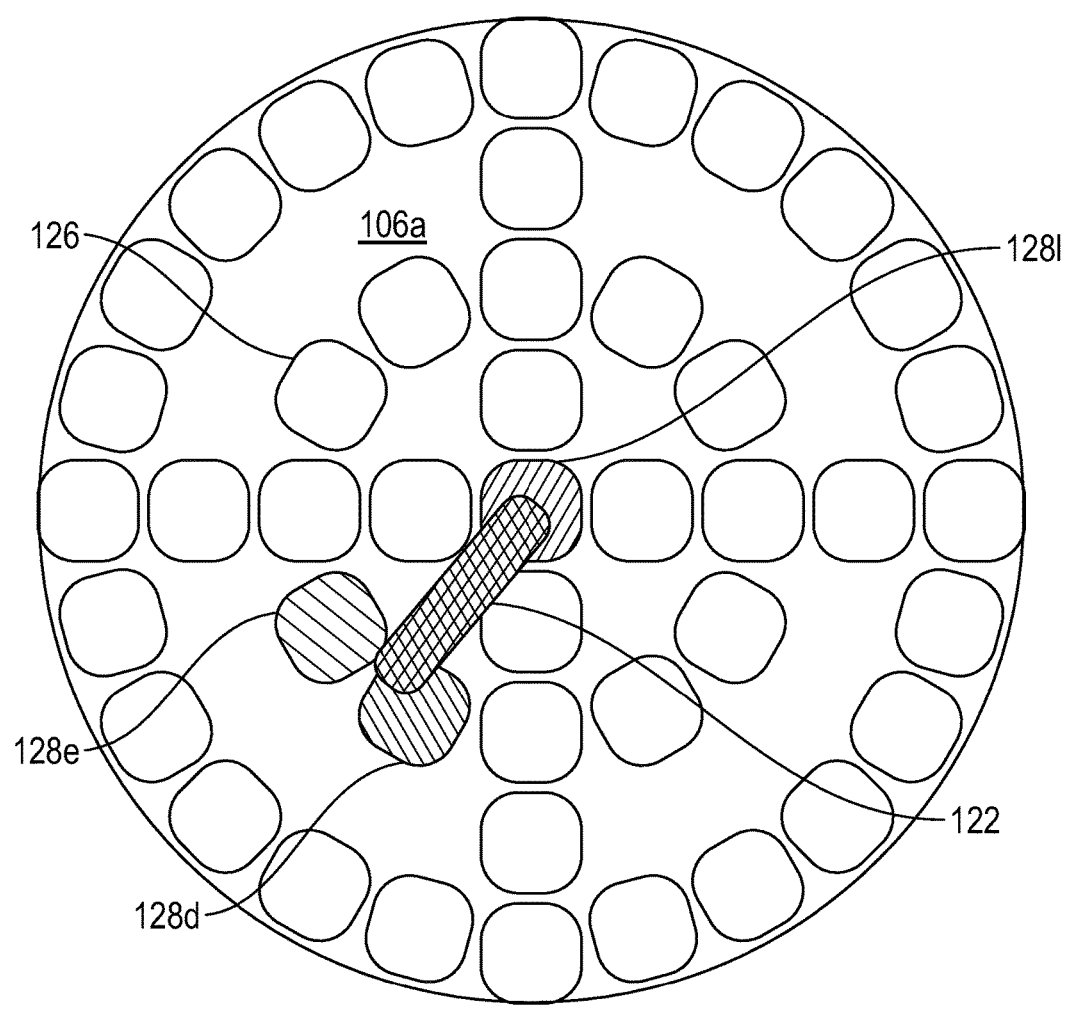
FIG. 17 illustrates a top view of the magnetic stirrer shown in FIG. 12 continuing to rotate in conjunction with another magnetized electromagnetic coil becoming magnetized as electrical current is applied, in accordance with an embodiment of the present invention.
Figure 18:
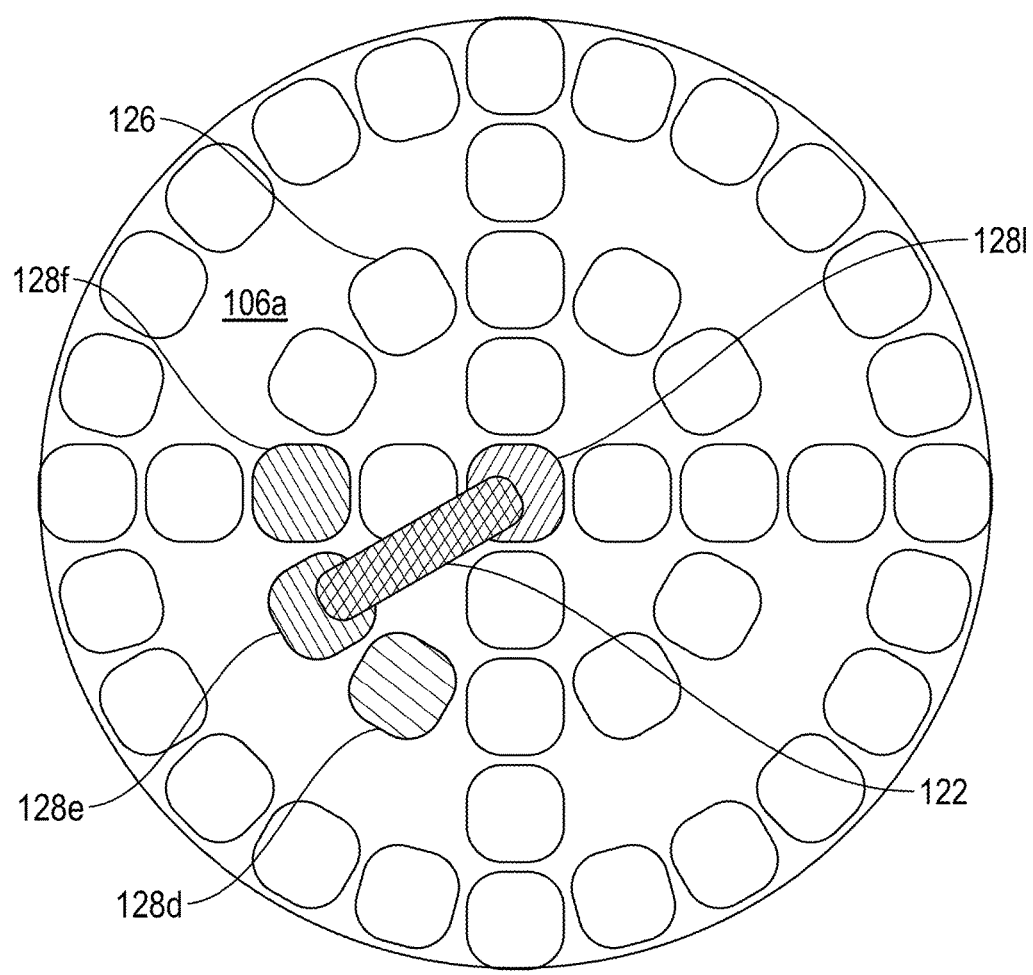
FIG. 18 illustrates a top view of the magnetic stirrer shown in FIG. 12 continuing to rotate in conjunction with another magnetized electromagnetic coil becoming magnetized as electrical current is applied, in accordance with an embodiment of the present invention.
Figure 19:
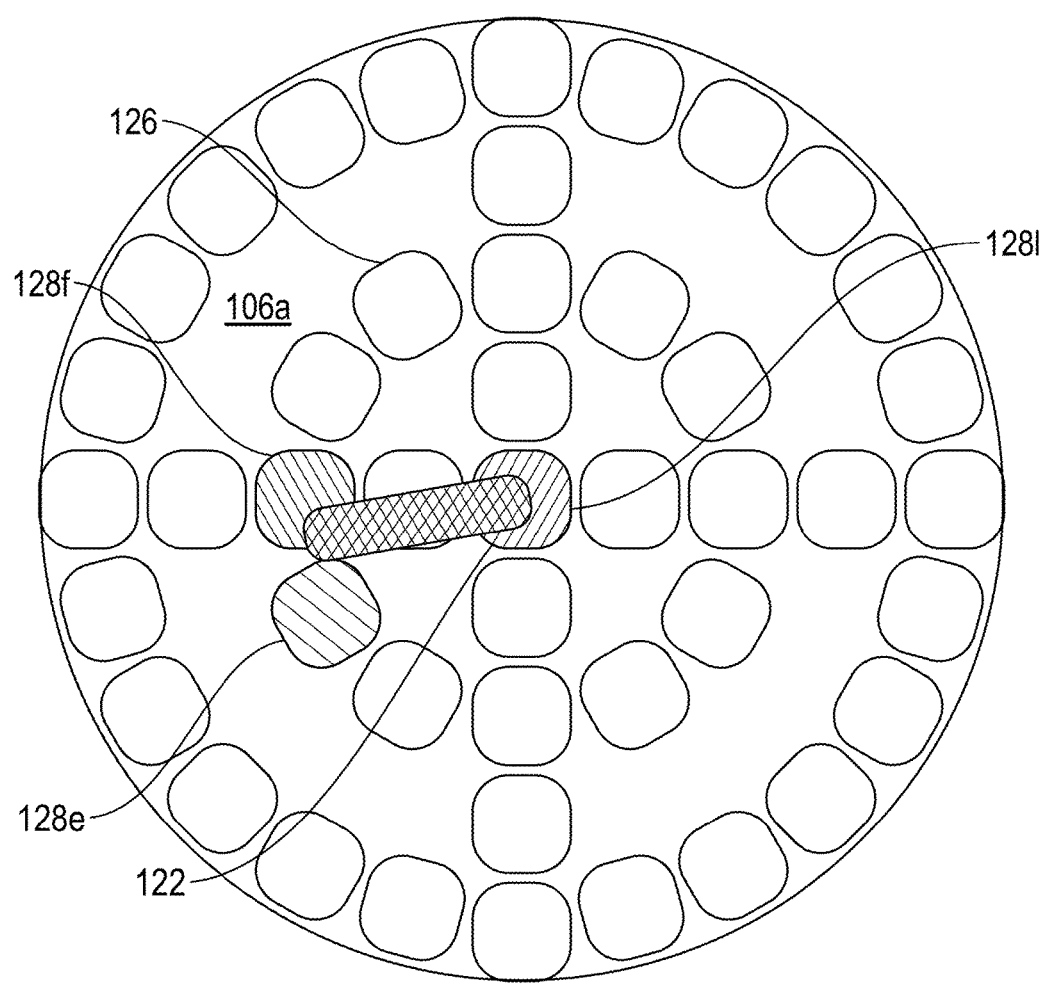
FIG. 19 illustrates a top view of the magnetic stirrer shown in FIG. 12 continuing to rotate and almost perpendicular to the starting position shown in FIG. 12 as another magnetized electromagnetic coil becomes magnetized while electrical current is applied, in accordance with an embodiment of the present invention.

Continuing the stirring path, FIG. 17 illustrates magnetic stirrer 122 continuing to rotate in conjunction with another portion magnetized electromagnetic coil 128e becoming magnetized as electrical current is applied. FIG. 18 illustrates magnetic stirrer 122 continuing to rotate in conjunction with another portion of magnetized electromagnetic coil 128f becoming magnetized as electrical current is applied. FIG. 19 illustrates magnetic stirrer 122 continuing to rotate and almost perpendicular to the starting position shown in FIG. 12 as additional portions of electromagnetic coil 128l, 128e, 128f become magnetized 128l, 128e, 128f.

Figure 20:
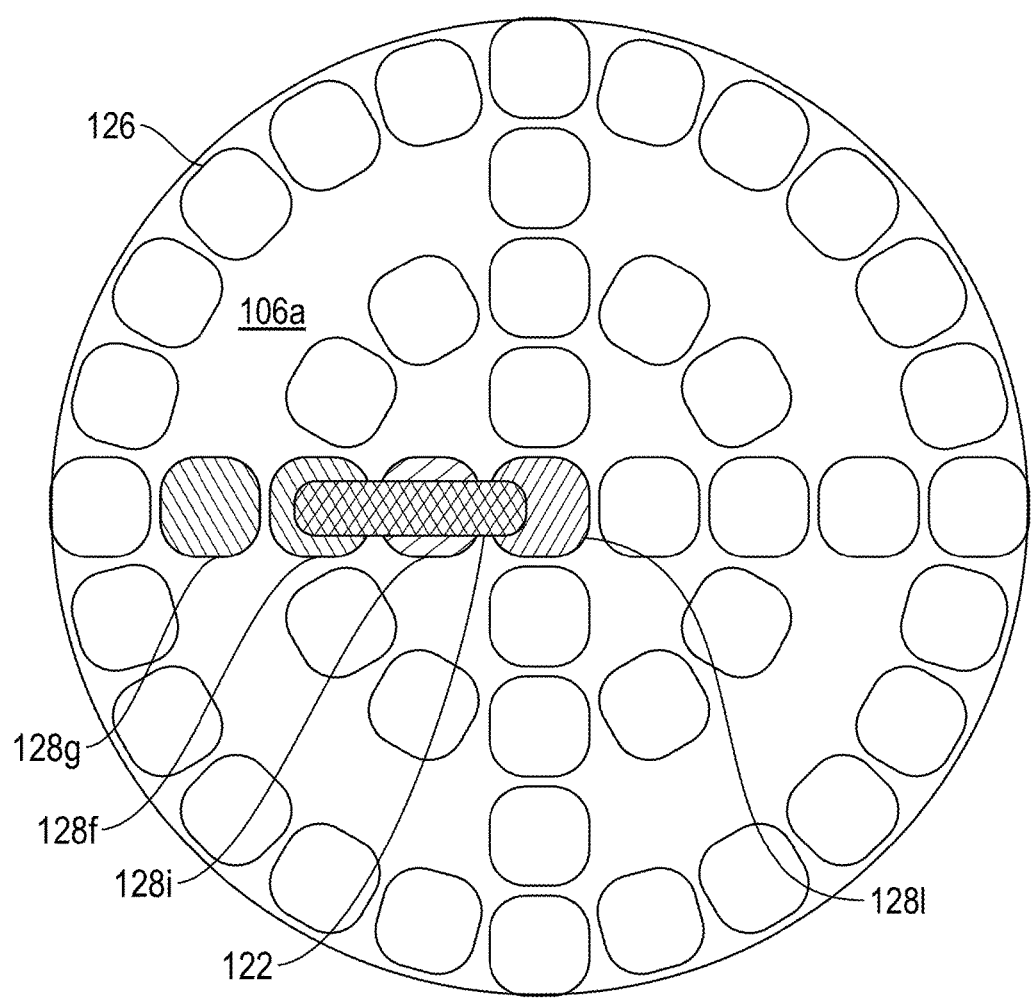
FIG. 20 illustrates a top view of the magnetic stirrer shown in FIG. 12 continuing to rotate and perpendicular to the starting position shown in FIG. 12 as another magnetized electromagnetic coil becomes magnetized while electrical current is applied, in accordance with an embodiment of the present invention.
Figure 21:
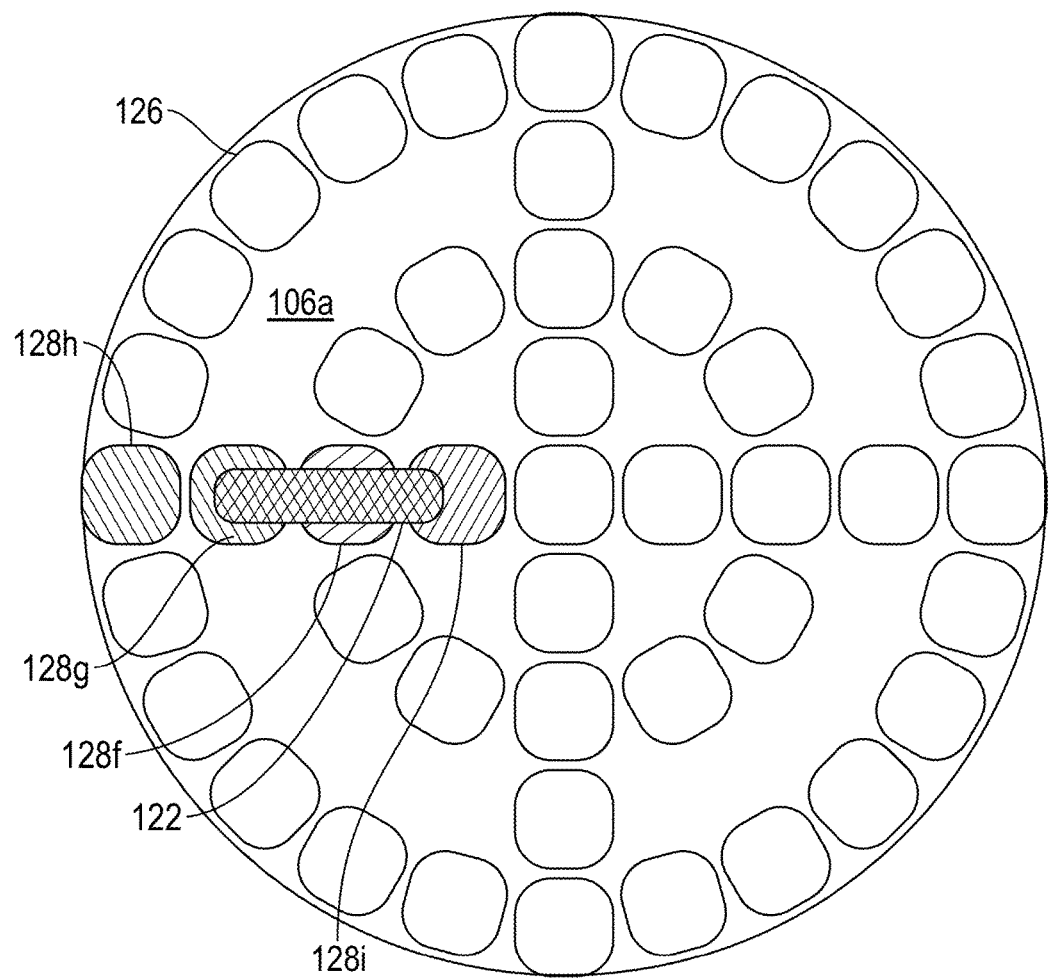
FIG. 21 illustrates a top view of the magnetic stirrer shown in FIG. 12 continuing to rotate and moving towards the edge of the cookware as another magnetized electromagnetic coil becomes magnetized while electrical current is applied, in accordance with an embodiment of the present invention.
Figure 22:
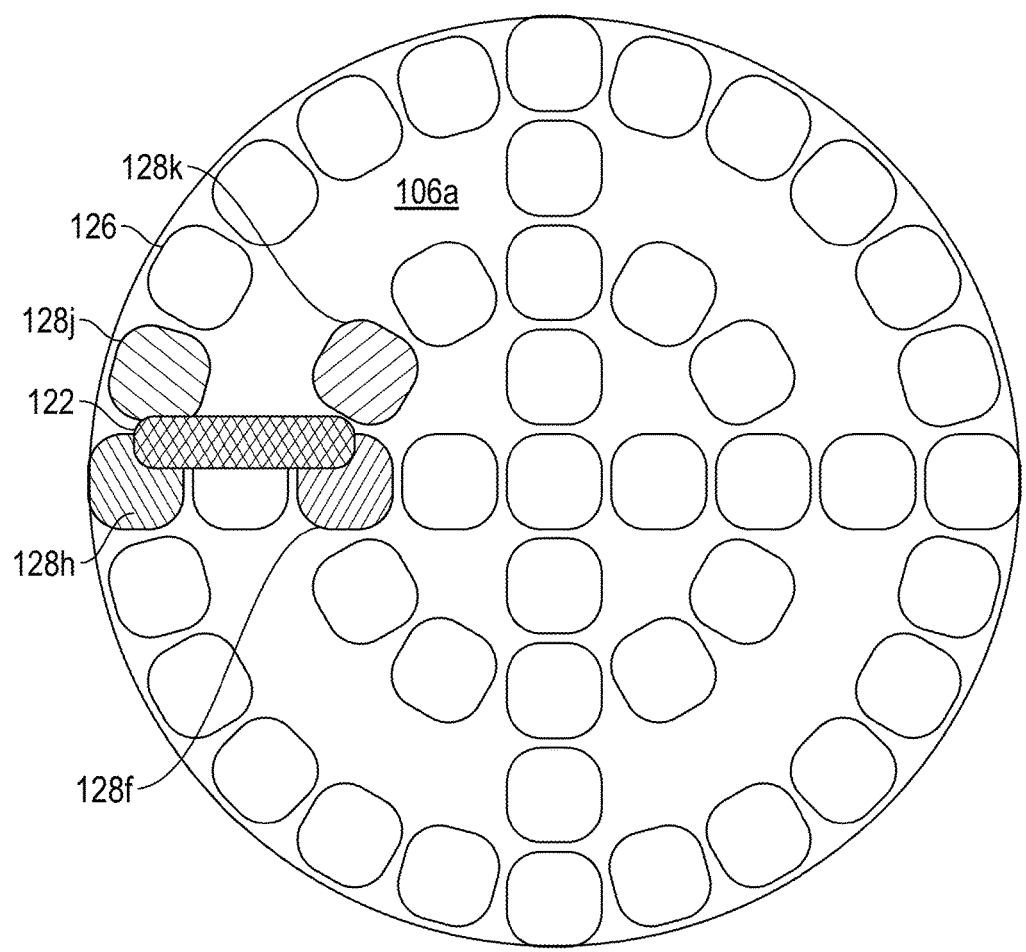
FIG. 22 illustrates a top view of the magnetic stirrer shown in FIG. 12 continuing to rotate and moving laterally towards the edge of the cookware as another magnetized electromagnetic coil becomes magnetized while electrical current is applied, in accordance with an embodiment of the present invention.

Continuing with the stirring pattern of magnetic stirrer 122, FIG. 20 illustrates magnetic stirrer 122 continuing to rotate and perpendicular to the starting position as another portion of magnetic coil 128g becomes magnetized. FIG. 21 illustrates magnetic stirrer 122 shown in FIG. 12 continuing to rotate and moving towards the edge of the cookware as another magnetized electromagnetic coil 128h becomes magnetized. FIG. 22 illustrates magnetic stirrer 122 continuing to rotate and moving laterally towards the outer surface 106b of cookware as another magnetized electromagnetic coil 128j, 128k becomes magnetized while electrical current is applied.

Looking now at FIG. 9, a controller 112 operatively connects to electrical power source 110. Controller 112 regulates electrical current through the electromagnetic coil 116 and heating element 104 of the cookware 102. In one embodiment, controller 112 regulates electricity from electrical power source 110 before carrying electricity through the electromagnetic coils 116 in different directions and intensities. In this manner, external magnetic field 118 that is produced by electromagnetic coil 116 can be manipulated based on the varying direction and intensity of electrical current applied to the electromagnetic coil 116.

Specifically, the speed and direction of magnetic stirrer 122 motions can be adjustably varied in accordance with the varying electrical current—and of course with the path followed along the geometric pattern 120a, 120b, 120c. Thus, controller 112 allows heating and stirring functions to operate independently of each other, whereby stirring on the cooking surface 106a of the cookware 102 can occur without heating the cookware 102.

In one embodiment, controller 112 provides a digital display and labeled light emitting diode (LED) lights to facilitate control of electricity. The digital display and LED lights form part of the user interface that facilitate operation of the assembly 100, and specifically the stirring and heating functions. In one embodiment, controller 112 comprises a power switch, i.e., On/Off switch. The power switch is operable with heating element 104 or electromagnetic coil 116, independently of each other. This independent operational capacity enables assembly 100 to stir without cooking, cook without stirring or cook while stirring.

As described above, assembly 100 provides a timer 114 to regulate the duration of operation of the heating element 104 and stirring (FIG. 10). In one embodiment, timer 114 operatively connects to controller 112, so that the duration for operation of the heating element 104 can be controlled and coordinated with magnetic stirrer 122.

Assembly 100 can operate with or without timer 114. Thus, after a time-out period, the digital display defaults to either the timer 114 if active, or a current temperature. In alternative embodiments, controller 112 allows for the preprogramming of advanced timer-based patterns of cooking, stirring, alert sounds, including beeps, text to speech and rest, which can be scheduled as the user desires with the timer 114.

In some embodiments, assembly 100 may further include a Wi-Fi transmitter 126 that enables remote monitoring and control of heating and stirring functions for assembly 100. Wi-Fi transmitter 126 is disposed in the handle 108 of the cookware 102. In some embodiments, the cookware 102 comprises a temperature inductive probe 124 to monitor the relatively high temperatures generated during cooking.

Wi-Fi transmitter 126 and heating element 104 are electrically connected to the temperature inductive probe 124. In some embodiments, Wi-Fi transmitter 126 accesses a network via Ethernet or wireless connection in order to enable users to control the controller 112 via a web-driven API, either to be controlled by a proprietary application or cloud-based services.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A cookware and geometrically patterned magnetic stirrer assembly, the assembly comprising:
    a cookware comprising a cooking surface, an outer surface, and a heating element operable to generate heat for the cooking surface;
    at least one magnetic stirrer operational on the cooking surface;
    an electromagnetic coil integrated between the cooking surface and the outer surface, the electromagnetic coil arranged in at least one geometric pattern;
    an electrical power source operatively connected to the at least one electromagnetic coil, the electrical power source operable to transmit an electrical current through the electromagnetic coil,
    whereby the electromagnetic coil produces at least one magnetic field through the cooking surface,
    whereby the at least one magnetic stirrer is responsive to the at least one magnetic field,
    whereby at least one distal electromagnetic coil positioned adjacent to and horizontally apart from a first end of the magnetic stirrer is activated to receive the electrical current to produce a magnetic field of an opposite polarity to the first end of the magnetic stirrer, and at least one proximal electromagnetic coil positioned to at least partially horizontally overlap the magnetic stirrer is inactivated to not receive the electrical current, thereby causing a decentering of the magnetic stirrer whereby a center of the magnetic stirrer moves in a direction of the at least one distal electromagnetic coil,
    whereby each electromagnetic coil is positioned adjacent to at least two other electromagnetic coils to form the at least one geometric pattern consisting of at least one row of electromagnetic coils bisecting at least one circle of electromagnetic coils,
    and
    a controller operatively connected to the electrical power source, the controller operable to vary the electrical current,
    whereby the speed and direction of the at least one magnetic stirrer varies in accordance with the varying electrical current,
    whereby the heat generated by the heating element varies in accordance with the varying electrical current,
    whereby the speed and direction of the at least one magnetic stirrer, and the heat generated by the heating element are independently regulated by the controller.

2. The assembly of claim 1, wherein the cookware includes at least one of the following: a skillet, a slow cooker, a frying pan, a pressure cooker, and a Dutch oven.

3. The assembly of claim 1, wherein the cookware comprises a handle.

4. The assembly of claim 3, wherein the cookware comprises a Wi-Fi transmitter.

5. The assembly of claim 4, wherein the Wi-Fi transmitter is disposed in the handle of the cookware.

6. The assembly of claim 5, wherein the cookware comprises a temperature inductive probe.

7. The assembly of claim 6, wherein the Wi-Fi transmitter and the heating element are electrically connected to the temperature inductive probe.

8. The assembly of claim 1, wherein the heating element is operable to convert the electrical current into heat through the processes of induction heating, or resistive heating, or both.

9. The assembly of claim 1, wherein the at least one magnetic stirrer comprises a stirring bar, or a blade like-stirrer, or both.

10. The assembly of claim 1, wherein the heating element is operatively connected to a timer, the timer operational to control the duration of operation of the heating element.

11. A cookware and geometrically patterned magnetic assembly, the assembly comprising:
    a cookware comprising a cooking surface, an outer surface, and a heating element operable to generate heat for the cooking surface;
    at least one magnetic stirrer operational on the cooking surface;
    an electromagnetic coil integrated between the cooking surface and the outer surface, the electromagnetic coil arranged in at least one geometric pattern;
    an electrical power source operatively connected to the at least one electromagnetic coil, the electrical power source operable to transmit an electrical current through the electromagnetic coil,
    whereby the electromagnetic coil produces at least one magnetic field through the cooking surface,
    whereby the at least one magnetic stirrer is responsive to the at least one magnetic field, whereby at least one distal electromagnetic coil positioned adjacent to and horizontally apart from a first end of the magnetic stirrer is activated to receive the electrical current to produce a magnetic field of an opposite polarity to the first end of the magnetic stirrer, and at least one proximal electromagnetic coil positioned to at least partially horizontally overlap the magnetic stirrer is inactivated to not receive the electrical current, thereby causing a decentering of the magnetic stirrer whereby a center of the magnetic stirrer moves in a direction of the at least one distal electromagnetic coil, whereby each electromagnetic coil is positioned adjacent to at least two other electromagnetic coils to form the at least one geometric pattern;

a controller operatively connected to the electrical power source, the controller operable to vary the electrical current, whereby the speed and direction of the at least one magnetic stirrer varies in accordance with the varying electrical current, whereby the heat generated by the heating element varies in accordance with the varying electrical current, whereby the speed and direction of the at least one magnetic stirrer, and the heat generated by the heating element are independently regulated by the controller;

a Wi-Fi transmitter disposed in the cookware, the Wi-Fi transmitter operational to remotely control and monitor the assembly; and a timer disposed in the cookware, the timer operational to control the duration of operation of the heating element.

12. The assembly of claim 11, wherein the at least one geometric pattern includes at least one of the following: a circular portion bisected by a linear portion, a rectangular portion bisected by a linear portion, or a triangular portion bisected by a linear portion.

13. The assembly of claim 12, wherein the Wi-Fi transmitter is disposed in a handle of the cookware.

14. The assembly of claim 13, wherein the cookware comprises a temperature inductive probe.

15. The assembly of claim 14, wherein the Wi-Fi transmitter and the heating element are electrically connected to the temperature inductive probe.

16. A cookware and geometrically patterned magnetic stirrer assembly, the assembly consisting of:

a cookware comprising a cooking surface, an outer surface, a handle, and a heating element operable to generate heat for the cooking surface;

at least one magnetic stirrer operational on the cooking surface;

an electromagnetic coil integrated between the cooking surface and the outer surface, the electromagnetic coil arranged in at least one geometric pattern;

an electrical power source operatively connected to the at least one electromagnetic coil, the electrical power source operable to transmit an electrical current through the electromagnetic coil, whereby the electromagnetic coil produces at least one magnetic field through the cooking surface, whereby the at least one magnetic stirrer is responsive to the at least one magnetic field, whereby at least one distal electromagnetic coil positioned adjacent to and horizontally apart from a first end of the magnetic stirrer is activated to receive the electrical current to produce a magnetic field of an opposite polarity to the first end of the magnetic stirrer, and at least one proximal electromagnetic coil positioned to at least partially horizontally overlap the magnetic stirrer is inactivated to not receive the electrical current, thereby causing a decentering of the magnetic stirrer whereby a center of the magnetic stirrer moves in a direction of the at least one distal electromagnetic coil, whereby each electromagnetic coil is positioned adjacent to at least two other electromagnetic coils to form the at least one geometric pattern;

a controller operatively connected to the electrical power source, the controller operable to vary the electrical current separately to each electromagnetic coil.

17. The assembly of claim 16, wherein each electromagnetic coil is positioned adjacent to at least two other electromagnetic coils to form the at least one geometric pattern consisting of at least one row of electromagnetic coils bisecting at least one circle of electromagnetic coils.

18. The assembly of claim 16, wherein each electromagnetic coil is positioned adjacent to at least two other electromagnetic coils to form the at least one geometric pattern consisting of at least one row of electromagnetic coils bisecting at least one of: a circle of electromagnetic coils, a triangle of electromagnetic coils, a square of electromagnetic coils, or a rectangle of electromagnetic coils.

19. The assembly of claim 16, wherein the plurality of electromagnetic coils forms the at least one geometric pattern consisting of at least one row of electromagnetic coils linked to at least one curved portion of electromagnetic coils.

20. The assembly of claim 16, wherein each electromagnetic coil is positioned adjacent to at least two other electromagnetic coils to form the at least one geometric pattern consisting of at least one of: a circle or a multi-sided continuous geometric shape.

* * * * *